United States Patent [19]

Reed et al.

[11] 4,337,159

[45] Jun. 29, 1982

[54] SHEAR-STABILIZED EMULSION FLOODING PROCESS

[75] Inventors: Ronald L. Reed; Clarence W. Carpenter, Jr., both of Houston, Tex.

[73] Assignee: Exxon Production Research Company, Houston, Tex.

[21] Appl. No.: 161,195

[22] Filed: Jun. 19, 1980

[51] Int. Cl.³ ............................................. E21B 43/22
[52] U.S. Cl. .............................. 252/8.55 D; 166/273; 166/274
[58] Field of Search .................. 252/8.55 D; 166/252, 166/273, 274, 275

[56] References Cited

U.S. PATENT DOCUMENTS

| | | | |
|---|---|---|---|
| 3,885,628 | 5/1975 | Reed et al. | 166/252 |
| 3,981,361 | 9/1976 | Healy | 166/252 |
| 3,983,940 | 10/1976 | Carpenter et al. | 252/8.55 X |
| 4,059,154 | 11/1977 | Braden et al. | 166/274 |
| 4,125,156 | 11/1978 | Glinsmann | 166/252 |
| 4,240,504 | 12/1980 | Reed | 166/273 |

OTHER PUBLICATIONS

Healy et al., Article in *Society of Petroleum Engineers Journal*, 1976, pp. 147–160.

*Primary Examiner*—Herbert B. Guynn
*Attorney, Agent, or Firm*—Michael A. Nametz

[57] ABSTRACT

Additional amounts of crude oil are recovered from a subterranean formation by flooding with a translucent emulsion comprising an upper- or middle-phase microemulsion as an external phase and a polymer-containing brine solution as an internal phase. The translucent emulsion tends to coalesce into its component phases under conditions of no shear, but is stabilized by low shears such as those imposed on fluids flowing through a subterranean formation.

12 Claims, 5 Drawing Figures

SHEAR-STABILIZED EMULSION FLOODING PROCESS

BACKGROUND OF THE INVENTION

1. Field of the Invention

This invention relates to the recovery of oil from a subterranean formation. More specifically, this invention relates to the recovery of oil from subterranean formations by injecting thereinto liquids containing both viscosifiers and microemulsions.

2. Description of the Prior Art

The petroleum industry has recognized for many years that only a small fraction of the original oil in place in a reservoir is expelled by natural mechanisms. It is also well-known that conventional methods of supplementing natural recovery are relatively inefficient. Typically, a reservoir may retain half its original oil even after the application of currently available methods of secondary recovery. Accordingly, there is a continuing need for improved recovery methods which will substantially increase the ultimate yield of petroleum from subterranean reservoirs.

Waterflooding is by far the most widely practiced method for recovering oil from a formation after naturally occurring forces in the formation have declined in their ability to expel oil. In waterflooding, water is injected through an input well to drive oil to offset producing wells. Much of the current work in oil recovery technology has been directed toward improving the efficiency of waterflooding processes or developing alternative processes.

Surface-active agents or surfactants are one class of materials which have been proposed for improving the efficiency of waterflooding processes. Much of the oil that is retained in the reservoir after a typical waterflood is in the form of discontinuous globules or discrete droplets which are trapped within the pore spaces of the reservoir. Because the normal interfacial tension between the reservoir oil and water is so high, these discrete droplets are unable to sufficiently deform to pass through narrow constrictions in the pore channels. When surface-active agents are added to the flood water, they lower the interfacial tension between the water and the reservoir oil and permit the oil droplets to deform and flow with the flood water. It is generally conceded that the interfacial tension between the flood water and the reservoir oil must be reduced to less than 0.1 dyne/cm for additional recovery.

One method for reducing interfacial tensions and increasing oil recovery is through the use of microemulsions. Microemulsions are thermodynamically stable, transparent or translucent mixtures of a liquid hydrocarbon, water and a surfactant. Optionally, a co-solvent such as alcohol and electrolytes may be present in the mixture. Generally, microemulsions may be oil-external, water-external or microemulsions wherein no external phase can be identified. In practice of microemulsions slug is typically injected into the formation, followed by an aqueous slug thickened with a polymer (a mobility buffer) which are both driven towards a producing well by injecting water or brine.

In a departure from conventional microemulsion flooding, wherein the microemulsion is miscible with the formation fluids at least prior to injection, it has been suggested in U.S. Pat. No. 3,885,628 (Reed, et al) to inject microemulsion systems which are initially immiscible with formation crude oil and formation water. This patent also suggests injecting two or more mutually immiscible phases into the oil-bearing formations to recover oil. The different phases preferably have physical and chemical properties broadly approximating those of the formation fluids. Although this approach to microemulsion flooding appears to have promise in recovering oil, surfactant and polymer adsorption and retention continue to reduce displacement efficiency.

In U.S. Pat. No. 4,240,504 (R. L. Reed), a microemulsion phase is simultaneously injected into a formation with an immiscible aqueous phase at controlled rates and viscosities. Under the specified conditions, the microemulsion phase is believed to preferentially displace crude oil while the immiscible aqueous phase preferentially displaces brine, thereby increasing oil displacement efficiency.

In U.S. Pat. No. 4,125,156 (Glinsmann) an enhanced oil recovery method is disclosed which uses an aqueous surfactant system which is capable of forming a multiphase microemulsion system in situ upon injection into the formation, which microemulsion when complete is immiscible with the reservoir crude.

Unfortunately, the very low interfacial tension which exists between a microemulsion and an oil/water bank means negligible capillary pressure and relative permeabilities nearly proportional to phase saturations. Under these circumstances the mobility of the microemulsion increases in the transition zone between the oil/water bank and the microemulsion, tending to promote fingering. As the microemulsion sweeps out the oil from a portion of the reservoir, the effective permeability of the reservoir increases, promoting flow through the swept region, and inherently encouraging fluids to finger and bypass oil. For this reason, prior methods suggest the addition of a mobility control polymer or viscosifying agent to the microemulsion or other injected phases. However, this creates a new set of problems. Often, not enough polymer will dissolve or disperse in higher salinity microemulsions or other phases to give good mobility control. Further, bank deterioration upon flooding often results in repartitioning of polymer resulting in the break-out of gel-like aqueous phases or viscous emulsions, and causes increased surfactant retention. This problem of polymer partitioning and consequent plugging, etc., generally becomes worse upon the formation of multiple phases in a reservoir during flooding. For example, an indication of phase instability upon polymer addition to an ordinarily optimum injection composition is evident in previously cited U.S. Pat. No. 4,125,156, Column 22, Table VIII (see footnote "d"). Some of these problems and possible reasons therefor are discussed by E. I. Sandvik and J. M. Maerker in "Application of Xanthan Gum for Enhanced Oil Recovery," ACS Symposium Series, No. 45, *Extracellular Microbial Polysaccharides*, edited by P. A. Sanford and A. Laskin, p. 242 (1977).

Changes in phase character and phase behavior at the front and back of the microemulsion bank due to dilution also generally tend to increase surfactant retention, e.g. by increasing phase trapping. Some of the residual oil may not be accessible to the microemulsion until surfactant concentration has become too low for mobilization. There are other reasons that relate to cost and mobility control. To reduce the cost of a given process will require more efficient surfactant use, i.e., increased oil recovery per unit weight of surfactant injected. Surfactant contained in a given flooding medium is wasted through adsorption, phase trapping and mixing with resident brine and polymer drive water to the point where its concentration is so low that it becomes ineffective. When surfactant resides in a phase having an aqueous character, it flows preferentially through smaller pores where surface area per unit volume is high, and so is adsorption.

A need, therefore, exists for an enhanced oil recovery process which utilizes fluids giving the requisite interfacial tension reduction with minimal surfactant retention, capable of incorporating sufficient quantities of a polymer to give good mobility control.

SUMMARY OF THE INVENTION

This invention relates to an enhanced oil recovery process utilizing new formulations to alleviate the problems with prior art methods. In accordance with the invention, a new and unusual liquid formulation is provided for injection into a subterranean formation and having special properties upon flow through said formation. The formulation is a heretofore unknown translucent emulsion formed by a unique mixture of an upper- or middle-phase microemulsion, and an aqueous solution of electrolytes containing a polymeric viscosifier. The microemulsion and the aqueous phase are in chemical equilibrium, and when mixed together under relatively low shear such as would be imposed on the fluid flowing through a formation, a translucent emulsion forms. The emulsion, however, tends to separate into its component phases under no-shear conditions and hence is thermodynamically unstable. The outer phase of the emulsion is the upper- or middle-phase microemulsion while the inner phase is the aqueous solution which contains most of the polymeric viscosifier. The new enhanced recovery process may be referred to as a shear-stabilized emulsion flooding process because the emulsion tends to remain intact under relatively low rates of shear such as are typically imposed on a fluid during flow through a formation.

Shear-stabilized emulsion flooding significantly alleviates many of the problems with prior art processes and compositions in achieving both ultralow interfacial tension values and incorporating sufficient polymer for good mobility control. Surfactant concentrations have been significantly reduced while obtaining equivalent or better oil recovery as compared to conventional microemulsion flooding processes.

DETAILED DESCRIPTION OF THE INVENTION

In accordance with this invention, an upper or middle phase microemulsion and an aqueous liquid phase which contains substantial amounts of a viscosifying agent are formulated so as to be in substantially complete chemical equilibrium and which, under relatively low shear rates, mix to form a translucent emulsion. The external phase of the emulsion is the middle or upper phase microemulsion while the internal phase is the aqueous liquid containing most of the polymer. The emulsion is thermodynamically unstable, but will not coalesce under the relatively low shear that acts on a fluid flowing through a formation.

A notable discovery is that variations in the polymer concentration have an extremely significant effect on the external phase/internal phase interfacial tension. In order for the requisite translucent emulsion to form, the interfacial tension between the external microemulsion phase and the internal polymer-containing brine phase will generally be less than $10^{-3}$ dynes per centimeter, and preferably less than about $10^{-4}$ dynes per centimeter. In part, the present invention is based on the discovery of translucent emulsions of acceptable viscosity; preparation of such emulsions requires specific proportions of surfactant, optional cosurfactant or cosolvent, oil, and brine in combination with a polymeric viscosifier. The properties of the emulsion are such that, once the proper component concentrations for the microemulsion and polymer-brine phases have been selected, large amounts of internal polymer-brine phase may be incorporated to give an emulsion having a mobility less than or equal to the total mobility of formation crude oil and brine, without affecting the system's chemical equilibrium. The formulation provides a liquid medium having an external phase that can effectively displace crude oil and with good relative mobility (on the order of 1.0 or less).

The expression "microemulsion" as used herein is defined as a thermodynamically stable, transparent or translucent micellar solution of oil, water and a surfactant. The solution may optionally contain one or more electrolytes and one or more cosurfactants or co-solvents. The upper-phase or middle-phase microemulsion utilized in formulating the translucent emulsion may respectively be oil external or may fall into that class of micellar structures in which there is no identifiable external phase. A discussion of the phase behavior and properties of microemulsion systems may be found in R. N. Healy, R. L. Reed, and D. G. Stenmark, "Multiphase Microemulsion Systems", *Society of Petroleum Engineers Journal*, pp. 147–160 (1976). A general discussion of "microemulsions" may be found in P. A. Winsor, "Solvent Properties of Amphiphilic Compounds", Butterworth's Scientific Publications, London (1954); see also P. A. Winsor, "Liquid Crystallinity in Relation to Composition and Temperature in Amphiphilic Systems" presented at the Third International Liquid Crystal Conference, Berlin, Aug. 24–28, 1970.

Figure 1:
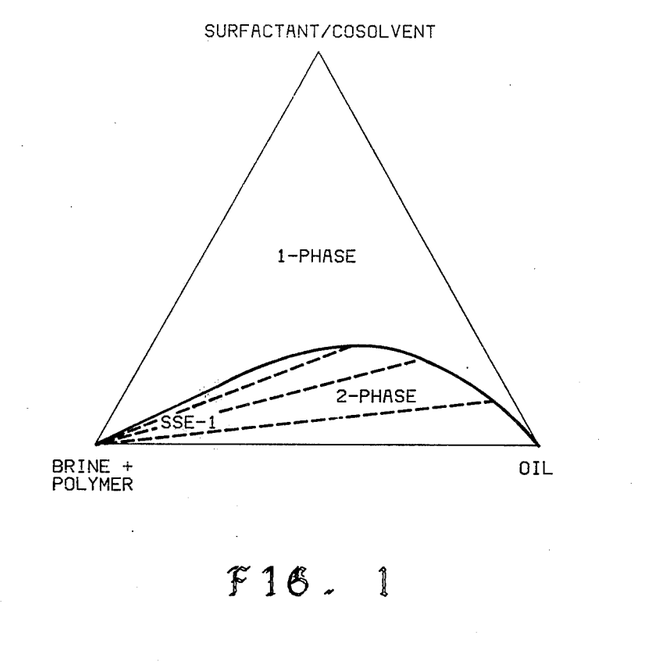
FIG. 1 is a ternary diagram representing injection compositions that result in shear-stabilized emulsion flooding.
Figure 2:
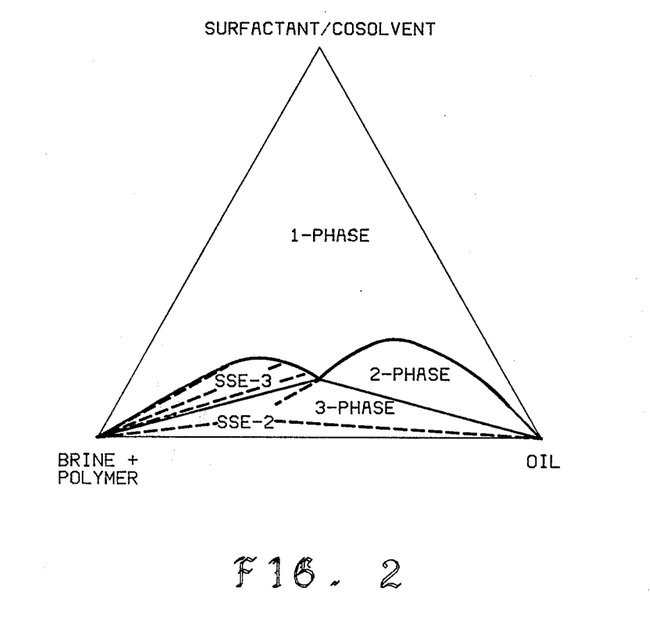
FIG. 2 is a ternary diagram representing other injection compositions that result in shear-stabilized emulsion flooding.

Referring now to FIG. 1, an upper-phase microemulsion system is depicted. The composition labeled SSE-1 will, on equilibration, separate into immiscible phases. The upper-phase will be a microemulsion containing most of the surfactant and small amounts of polymer. The lower-phase is excess brine, containing most of the polymer and very little surfactant. When these two phases are thoroughly mixed, an emulsion forms that is microemulsion external and which can be injected whole into a porous medium to recover oil. FIG. 2 is a ternary diagram at optimal salinity. The lower injection composition labeled SSE-2 will separate into three phases on equilibration: a lower, excess brine phase containing most of the polymer and little surfactant, a middle-phase that is a microemulsion and contains most of the surfactant and small amounts of polymer, and an upper excess-oil phase that contains little surfactant and insignificant amounts of polymer. Either the lower two of these three phases or all three can be injected as an emulsion to accomplish a shear-stabilized emulsion flood. The upper injection composition of FIG. 2 labeled SSE-3 on the ternary diagram (in the upper left "envelope"), upon equilibration, will separate into two phases, an upper-phase microemulsion that contains most of the surfactant and a quantity of polymer that depends on the total polymer concentration, and a lower brine phase that contains the bulk of the polymer. The micellar structure of these particular upper-phase microemulsions is such that they are more nearly related to middle-phase microemulsions than to the ordinary upper-phase microemulsions such as shown in FIG. 1. In fact, they will often become a middle-phase simply through addition of oil—for this reason they may be called oil-deficient middle-phase microemulsions (or "pseudo upper-phase" microemulsion). Such oil-deficient middle phase microemulsions are especially preferred for use as the external phase of the translucent emulsions as will be illustrated later in the Examples. Further information regarding this particular type of microemulsion may be found in the "Multiphase Microemulsion Systems" paper, cited previously, although the term "oil-deficient middle phase microemulsion" is not explicitly used.

In any event, once the proper chemical proportions are selected, thorough mixing of middle- or upper-phase microemulsion with the brine phase containing polymer provides a translucent emulsion suitable for a shear-stabilized emulsion flood. The SSE composition shown have much higher oil contents than necessary, merely for clarity of illustration. Note that these mixtures separate relatively rapidly on standing, hence they are true emulsions. However, they are also quite translucent, and hence the internal phase droplets are small, on the order of a micron or less.

For all these formulations, it is essential that the chemicals injected be mixed upon entering the formation and be of such a nature that if allowed to phase separate there will coexist at least two phases, an internal phase which contains predominantly brine and polymer, and the remaining external phase or phases containing most of the surfactant. Further, at least one of the remaining external phases must be a microemulsion. Note that in field applications, an intermediate phase-coalescence step is not required, as long as the emulsion is formed upon entering the formation. This simply means that the appropriate concentrations and proportions may be determined in the laboratory and then used to directly formulate the translucent emulsion. This eliminates the need to prepare the phases separately, followed by a separate mixing step.

It is important to use the correct proportion of materials designed to give the requisite translucent emulsion. The initial selection of a microemulsion for use as a starting point in the design of the external phase may be made in accordance with well-known procedures (e.g. U.S. Pat. No. 3,981,361). Thus, initially, an oil and brine are preferably selected so as to have approximately the same physical and chemical characteristics as that of the formation; however, the ultimate choice will depend on which oil and which brine result in optimum oil recovery as determined by core flooding experiments; on the availability of materials; and on the cost delivered to the flooding site. A convenient starting point, though, will generally be the preferred materials. Also, a temperature for conducting the microemulsion studies is selected to be approximately equivalent to the formation temperature; preliminary screening tests are conducted to identify a surfactant, cosurfactant, cosolvent and polymer for which phase behavior is likely to be acceptable for the formation conditions. Optimal salinity, $C_\phi$ will preferably be near or equal to the formation salinity, although core flooding results may indicate otherwise as discussed below. Any significant changes in optimal salinity brought about through the procedure adopted will be compensated by adjusting one or more system variables, or by preflushing resident brine to the new optimal salinity.

For reference, optimal salinity for phase behavior $(C_\phi)$ is that salinity of an aqueous phase at which the volume ratio of oil to surfactant $(V_o/V_s)$ and volume ratio of the aqueous phase to surfactant $(V_w/V_s)$ in the resulting microemulsion phase are substantially equal for systems in which the resulting microemulsion is saturated with both oil and aqueous phase. The optimal salinity for phase behavior depends on the oil, surfactant, surfactant concentration, and temperature as well. It has been established that $V_o/V_s$ is an increasing function of salinity, whereas $V_w/V_s$ is a decreasing function of salinity.

Often, the desired optimal salinity value will be set equal to the salinity of the brine contained in the formation to be flooded. This will frequently minimize adverse phase behavior upon the mixing of an injected liquid with formation brine. However, this is not always true, and occasionally core flooding results will indicate that optimum oil recoveries will be obtained when optimal salinity is different than the salinity of formation brine. In fact, flooding results may even dictate that a microemulsion should not be exactly at optimal salinity for optimum oil recovery.

The design of a translucent emulsion is iterative; i.e., the change of any system variable (e.g. surfactant concentration) requires some change in one or more other variables (e.g. cosurfactant or cosolvent concentration or type) to arrive at a suitable composition. At some point, the changes required will be so small as to become unnecessary. The procedure presented below is aimed at reducing the number of iterations by systematically evaluating the effect of each variable on system behavior. A significant feature is that, to develop a translucent emulsion of suitable viscosity, changes are indicated in certain system variables which would not conventionally be suggested. In particular, it has been discovered that the concentration of polymer has a very significant effect on interfacial tension and that the adjustment of variables in addition to polymer concentration is critical in developing a suitable effective system viscosity.

PREFERRED TRANSLUCENT EMULSION DESIGN PROCEDURE

1. Initial Salinity and Surfactant/Cosolvent Proportions—Using equal parts of oil and brine, determine the optimal salinity for phase behavior of a potentially useful microemulsion by noting the salinity where the volumes of oil and brine solubilized by a middle-phase microemulsion are equal. The optimal salinities of a number of different microemulsion systems which vary surfactant type and concentration, and which optionally include cosurfactants and/or cosolvents, will usually be determined to provide choices later when optimizing the process for the field. This assures a final microemulsion whose optimal salinity ($C_\phi$) will be near or equal to the salinity most likely to give good oil recoveries, usually the reservoir salinity.

For example, an initially selected microemulsion might typically contain a total surfactant (plus optional cosurfactant) concentration of 2% by weight and a surfactant/cosolvent (if used) ratio of 3:1. Measurement of the relative phase volumes of microemulsion samples which vary salinity at these surfactant/cosolvent proportions would indicate optimal salinity. The surfactant/cosolvent ratio and the surfactant concentration may be adjusted at a later state in the emulsion design process so as to improve viscosity and/or interfacial tension-phase behavior relationships.

The method for determining optimal salinity for phase behavior is known; see for example, the paper "Multiphase Microemulsion Systems", cited previously. Occasionally, the phase behavior as a function of salinity is atypical; e.g. more than one microemulsion phase may be observed in equilibrium at a fixed salinity, or solubilization parameters may not be strictly monotonic. However, those skilled in the art will be able to judge optimal salinity even in such complex cases. Furthermore, the ultimate salinity value and surfactant/cosolvent ratio will be determined by optimizing oil recovery obtained from core floods. Further discussion of these exceptional cases may be found in "Compositional Effects on Surfactantflood Optimization", by J. H. Hedges and G. R. Glinsmann, SPE 8324, presented at the 54th Annual Fall SPE Meeting, Las Vegas, Nevada, September 23-26, 1979.

At times, it may be preferred to use a mixture of two surfactants to achieve a desired optimal salinity. In this event, the surfactant/cosurfactant ratio is determined by scanning phase behavior as a function of the ratio at fixed salinity and fixed cosolvent concentration (if any), and noting the ratio where solubilization of oil equals that of brine in a middle-phase microemulsion.

2. Oil Concentration Limit—For the fixed surfactant concentration (cosolvent and cosurfactant concentrations, if used), systematically reduce the oil concentration until an oil concentration limit is reached below which there exists neither an excess oil phase nor an excess brine phase. This will provide a convenient upper limit for later systematically determining the effect of oil content on external phase microemulsion viscosity.

3. Mobility Limit—For the particular reservoir under consideration, determine the minimum viscosity which a translucent emulsion must have in order to displace an oil/brine bank without fingering. This is accomplished by graphing the "total relative mobility" of an oil/brine bank versus brine (or oil) saturation to give a minimum oil/water bank mobility, $\lambda_{min}(cp^{-1})$; see "Mobility Control Design for Miscible-Type Waterfloods Using Micellar Solutions", by W. B. Gogarty, H. P. Meabon, and H. W. Milton, Jr., J. Pet. Tech., Vol. 22, p. 141-147 February, 1970). For information, the total mobility is the sum of oil and water mobilities as determined by the oil and brine relative permeability curves for the particular reservoir and using resident oil and brine viscosities. Assume initially that the effective permeability to flow of the emulsion will be one-half the absolute permeability. This assumption is based on experience, but the value may have to be increased later based on core flooding results; see, for example, "A Laboratory Study of Microemulsion Flooding", by R. N. Healy, R. L. Reed, and C. W. Carpenter, Jr., Soc. Pet. Eng. J., p. 99 (February, 1975).

It then follows that the minimum viscosity of the emulsion, $\mu_{min} = 0.5/\lambda_{min}$.

4. Base Microemulsion Selection and Characterization—Determine the viscosity behavior of microemulsions at the selected optimal salinity. This is accomplished by preparing a series of microemulsion samples which vary the oil concentration (and cosolvent concentration, if used), within the limits of Step 2, at constant surfactant (and cosurfactant, if used) and brine concentrations as determined in Step 1. The viscosity of each sample is measured. Where cosolvent is also present, the resulting viscosity values are correlated to determine the dependence of microemulsion viscosity on oil and cosolvent concentration. The oil concentration (and cosolvent concentration, if any) is selected for a base microemulsion capable of further adjustments to give a final microemulsion which, when equilibrated with a polymer-brine phase, results in a translucent emulsion whose viscosity is greater than the minimum viscosity, $\mu_{min}$.

This step is important during the design process in selecting the ultimate oil concentration for the external microemulsion phase. For example, an oil concentration giving a microemulsion viscosity of 10 cp at 11 sec$^{-1}$ for a particular permeability might conventionally appear to give favorable mobility control for a crude oil of 6 cp viscosity, but might experimentally result in an emulsion viscosity of 4 cp. The viscosity data would then provide clear indications as to the proper concentrations; this can reduce the number of iterations in designing the emulsion, especially where substantially different concentrations than initially selected are required.

5. Polymer-Brine Phase Selection—The behavior of polymer partitioning between the microemulsion external phase and polymer-brine internal phase is determined to indicate proper component proportions which will give an emulsion of suitable viscosity. (Of course, other components will also partition between the phases, but the focus will be on the effect of the polymer.) Polymer-brine solutions are prepared at optimal salinity which vary the quantity of the polymeric thickener incorporated, i.e., samples of varying viscosity are prepared. Each polymer-brine solution of different viscosity is then mixed with varying amounts of base microemulsion under the same shear conditions, e.g. all samples rotated at constant 12 rpm in the same size test tube, for the same minimum length of time for thorough mixing, etc. Other mixing methods could be employed, so long as the same shear-history conditions are employed for each sample. The base microemulsion volume is varied, for example, from 10% to 90% of the total volume with 10% increments in between. Each sample combination is thoroughly mixed until a stable mixture viscosity is reached. (The mixture viscosity is measured from time to time using very small quantities of the various samples.) Phase separation of the various samples is then allowed to proceed until phase volumes are substantially constant. Note that the final volumes of the microemulsion phase and the polymer-brine phase will be different than the initial volumes for each sample mixture due to a partitioning of the various components between phases. Significantly, the extent of this partitioning depends not only on initial chemical composition, but also on the relative initial phase volumes. The viscosities of the various sample mixtures are then correlated with the relative final phase volumes. From this correlation, a polymer concentration may be selected for the polymer-brine phase which results in a translucent emulsion having a viscosity greater than $\mu_{min}$.

6. Formulation of the Base Emulsion—The final equilibrated brine-polymer phase and microemulsion phase of the sample mixture selected in step 5 are now analyzed for polymer, salt, and surfactant content (and for cosolvent and cosurfactant content, if used). These values are confirmed by separately formulating a microemulsion and a polymer-brine phase directly, which are then mixed in the same proportions as the sample mixture selected. Upon mixing and equilibration, these phase volumes should be invariant. With chemical composition defined to provide invariant phases volumes, the microemulsion and polymer-brine phases may be mixed in any proportion desired so long as the chemical concentrations of the components of the internal and external phases remain the same as defined by analysis. Further partitioning of components between phases will not take place to any significant extent and hence relative phase volumes will be constant. In practice, large amounts of polymer-brine phase will be utilized for economic reasons.

In optimizing for oil recovery, a number of different emulsion systems will be prepared and tested by conducting core flooding experiments to obtain the precise optimum conditions. Such experiments will indicate the value to be selected as optimal salinity, or whether the system should even be at optimal salinity; also, whether a cosolvent or cosurfactant should be used; the oil type; etc. Also, for any chosen emulsion system, because the adjustments made to the polymer, oil and surfactant concentrations may have affected the optimal salinity of the system, Steps 1 through 6 may need to be repeated in order to arrive at a translucent emulsion whose salinity has the desired value.

In any event, however the system is finally optimized, a base translucent emulsion will have been delineated by the foregoing procedure which will have a mobility less than a crude oil/brine bank in the formation of interest.

EMULSION COMPONENTS

Any viscosity increasing agent may be used in the preparation of a suitable translucent emulsion, so long as the appropriate proportions are utilized. Suitable materials may include a wide variety of gums, sugars, and various synthetic polymers. Preferable thickeners include water-soluble polymers including polysaccharides, as sold under the trade name "Kelzan XC" by Kelco Corporation as well as Pfizer 1035 biopolymer. High molecular weight polyacrylamides may also be used, more specifically, partially hydrolyzed polyacrylamides as sold under the trade name "Pusher" by Dow Chemical Company.

Any of the surfactants capable of causing a middle- or upper-phase microemulsion to form can be utilized in the present invention. For example, the surfactants applicable in accordance with the present invention can be any of those which are described in the following non-limiting list of U.S. Pat. Nos.: 3,254,714; 3,301,325; 3,330,344; 3,368,621; 3,455,386; 3,348,611; 3,455,385; 3,455,389; 3,443,635; 3,443,636; 3,406,754; 3,261,399; 3,297,985; 3,480,080; 3,478,823; 3,477,511; 3,469,630; 3,799,263; 3,885,626; and 3,977,471. Also the surfactants of U.S. Pat. Application Ser. No. 870,313 filed on Jan. 30, 1978, now U.S. Pat. No. 4,293,428, entitled "Propoxylated Ethoxylated Surfactants and Method of Recovering Oil Therewith" find utility in the method of the present invention.

The surfactants utilized in the emulsions of the present invention can be anionic, nonionic or cationic in character with particularly applicable surfactants being petroleum and synthetic sulfonates as well as polyoxyalkylated organic material and sulfates or sulfonates thereof. Anionic sulfonate surfactants can be illustrated by metal or ammonium salts of sulfonate surfactants, e.g., alkali metal or ammonium salts of sulfonated petroleum hydrocarbons such as alkylated napthalene sulfonates, alkylated benzene sulfonates; or the sulfocarboxylate salts; and the like. Exemplary sulfonates are the alkali metal (Na, K, Li) or ammonium salts of petroleum sulfonates such as $C_{15-30}$ alkyl aryl sulfonates, alkylated benzene sulfonates, and the like. Materials of this type are sold commercially under various trade names such as petroleum sulfonates sold by the Bray Chemical Company or the Bryton Chemical Company as Bryton Sulfonate, F, 430, 467, 500; or the Sonneborn Chemical Company as Petronates; or Mobil Oil Company as "Promor" sulfonates of the SS-6, SS-20 series; American Cyanamid's "Aerosol OT" which is sodium dioctyl sulfosuccinate; and the like. A suitable sulfonate mixture is a sodium salt of a petroleum sulfonate in the molecular weight range of 350–420 and a sodium salt of a petroleum sulfonate in the molecular weight range of 420–580, or a sodium salt of a mixture of petroleum sulfonates having an average molecular weight in the order of about 430–470 and mixtures of such sulfonates from the above low and high molecular weights, and other salts of such petroleum sulfonates.

Particularly applicable sulfonate surfactants utilized in the present invention are the synthetic sulfonates which can be generically described as $C_{6-24}$ benzene, toluene, or xylene sulfonates wherein the salt-forming cation is selected from alkali metals, ammonium, and amines such as $C_{1-4}$ mono-, di-, and tri-alkanol amines, an example being mono-ethanol-amine. An example of a surfactant having good characteristics in the environment of the present invention is a monoethanolamine $C_{12}$ orthoxylene sulfonate, i.e. an orthoxylene sulfonate containing a carbon chain predominating in $C_{12}$.

Other useful surfactants comprise sulfated or sulfonated polyoxyalkylated surfactants, including ethoxylated alcoholic compounds such as oxyalkylated alkanols which can be represented by the formula $RO(C_2H_4O)_{2-10}$—H; where R is an alkyl radical of 10–24 carbon atoms, the alcohol used in the ethoxylation being a mixture of alcohols of 10–24 carbon atoms; or propiosulfonate salts of polyethoxylated alcohols which can be represented by the formula $RO(CH_2CH_2O)_n CH_2CH_2CH_2SO_3M$ wherein R is alkyl having from 14 to 24 carbon atoms, n is from 2 to 10 and M is alkali metal, amine or ammonium cation, such as those compounds disclosed in British Pat. No. 1,560,346 to M. E. Tuvell.

Commercially available synthetic sulfonates include Witco ER 200, an ethoxylated alkanol sulfonate; and Amoco Sulfonate 151, a synthetic polyolefin sulfonate.

Sulfates of ethoxylated primary alcohols are commercially available from Shell Chemical Company under the trade name Neodol 23-23A having the formula $C_{12-13}O(CH_2CH_2O)_3SO_3NH_4$ and Neodol 25-3S of the formula $C_{12-15}O(CH_2CH_2O)_3SO_3Na$.

Other anionic sulfated ethoxylated alcohols are available from Union Carbide under the trade name Tergitol S such as Tergitol Anionic 14-S-3A (ammonium salt) or 15-S-3.0 (sodium salt).

The translucent emulsions of this invention will also contain additional electrolytes in order to give an aqueous phase having the desired salinity, which is usually similar to the salinity of the reservoir brine and also usually the optimal salinity for phase behavior of the microemulsion/polymer-brine system. This may require the addition of electrolytes such as sodium chloride and other alkali metal or ammonium salts of anions such as chlorides, sulfates, nitrates, carbonates, phosphates, or the like and mixtures thereof in order to result in an internal brine phase having a composition similar to that of the reservoir brine.

The microemulsions forming the external phase of the translucent emulsion may additionally contain one or more cosurfactants or cosolvents to adjust the brine tolerance of the surfactant; however, such use is optional and does not form the basis for this invention. Typical examples of cosolvents include alcohols, amides, amino compounds, esters, aldehydes and ketones containing one to about twenty or more carbon atoms. A specific cosolvent which has had utility is sec-butyl alcohol. Additional suitable examples are mentioned in U.S. Pat. No. 3,981,361, cited previously.

In preparing the external microemulsion phase, an oil component will generally be selected which imitates the composition of the reservoir crude in the sense that it has substantially the same equivalent alkane carbon number, EACN; for a discussion of the EACN concept, see "The Application of Interfacial Tension Scaling Rules to Binary Hydrocarbon Mixtures," by L. Cash, J. L. Cayias, G. Fournier, D. MacAlister, T. Schares, W. H. Wade, and R. S. Schechter, *J. Coll. Int. Sci.*, Vol. 59, p. 39 (1977); and also "Surfactantflooding With Microemulsions Formed In-Situ-Effect of Oil Characteristics", by G. R. Glinsmann, SPE 8326, presented at the 54th Annual SPE Meeting, Las Vegas, Nevada, Sept. 23-26, 1979. However, the oil may have a higher EACN if core flooding tests performed to optimize the process so indicate. The exact oil used will also depend on availability and cost as delivered to the flooding site. As mentioned, the salinity of the aqueous component of the emulsion is preferably substantially similar to the salinity of the reservoir brine, although again core flooding results may indicate otherwise.

OIL RECOVERY

Once a translucent emulsion has been designed for the given formation conditions, preferably optimized to define salinity, oil type, etc. for the greatest oil recovery, the process is ready to be used in the recovery of additional amounts of oil from a subterranean formation using conventional flooding procedures. Thus, an emulsion slug may be injected down one or more injection wells and into the formation to displace oil to one or more separated production wells. Alternatively, the separate microemulsion and polymer- containing brine phase may be injected into a well, with thorough mixing of the two phases taking place in transit to form the requisite translucent emulsion which enters the formation to displace oil. It is notable that the emulsion may be prepared directly, once the proper component proportions are determined, and then maintained in the emulsion state by any means capable of delivering shear to the emulsion (e.g. a propeller-type mixer or a circulating pump).

As mentioned previously, in preparing an emulsion for injection into a formation, large volumes of the polymer-brine phase may be used with respect to the microemulsion volume. Where large polymer-brine volumes are used, the concentrations of the surfactant, oil, cosolvent, etc., in the external microemulsion phase will remain the same as defined by design studies, although the overall quantity of surfactant with respect to total emulsion volume will become very small with increasing polymer-brine volumes. It may be theorized that the emulsion behaves as if it were a microemulsion having a high surfactant concentration, since the formation is contacted primarily by the external microemulsion phase. It is known that, in conventional microemulsion flooding, higher surfactant concentrations generally result in a more effective displacement of crude oil. A significant feature of this invention, therefore, is that the external phase contains a moderately high surfactant concentration, even though the total amount of surfactant used for a given volume of emulsion may be quite low. It is also theorized that the internal polymer phase may assist in driving oil from the formation by selectively plugging pore space containing water, thereby encouraging flow of the emulsion through pore space containing the crude oil. However, such theories regarding the mechanisms by which the present invention achieves superior oil recoveries should not be construed as limiting.

The emulsion does not coalesce and is stabilized upon flow through the formation due to the shear imposed thereby, at least until it becomes so diluted by crude oil and brine as to cause breakdown into separate phases. In this respect, as with any flooding process using any complex flooding medium, dilution will always be capable of altering the behavior of the medium as it flows through a formation. The dilution behavior of the present emulsions, however, is as good as, and is often better than that realized during conventional microemulsion flooding; and, this is achieved with only a fraction of the surfactant required for conventional microemulsion floods.

Generally, flow rates as low as 1 foot per day (average rate of frontal advance) through the formation will provide sufficient shear to stabilize the emulsion, although flow rates as low as 0.3 ft/day have proven to give sufficient shear. Even lower flow rates may be possible, and the lower limit has not been precisely determined. Of course, higher flow rates (and hence higher shears) may be employed, within the limits of the reservoir to accept fluid input without fracturing. Conventional flow rates used in microemulsion flooding will be sufficient to stabilize the translucent emulsion employed herein. Note that shear levels are indicated herein by "rpm" with respect to laboratory mixing data, and by flow rates with respect to core flooding and formation flooding information.

Following injection of the emulsion, thickened water is preferably injected into the formation to displace injected emulsion through the formation to one or more production wells. The thickened water may comprise ordinary water or brine containing one or more conventionally employed thickeners. Suitable thickeners include the conventional thickeners discussed above for use in preparing the translucent emulsion. The salinity of the brine may be adjusted to give desirable phase behavior and improved oil recovery.

Generally, the total amount of translucent emulsion injected into the subterranean formation in accordance with the present invention will range up to 2.5 pore volumes of the subterranean formation to be flooded. For purposes of economics it is preferred that the amount of microemulsion external phase contained in the emulsion injected be minimized, in order to minimize surfactant use, but that the bank size be as large as possible within the economic constraints imposed by the project life. In fact, a benefit of this invention is that a given quantity of surfactant may be used much more efficiently in displacing oil than the equivalent quantity when used in conventional micellar flooding. For example, in a conventional micellar flooding process, a 0.25 pore volume bank of a microemulsion containing 2% surfactant might recover 80% of the residual oil in the contacted region of a reservoir. For the same size bank of a shear stabilized emulsion, the same quantity of oil would be recovered with only 1% surfactant.

If desired, a bank of water containing the viscosity-increasing agent may be injected before injecting the emulsion, i.e. a preflush solution is injected. The composition of the preflush bank will typically be the same as the polymer-brine phase used to prepare the translucent emulsion, although the exact composition will depend on the phase behavior of the emulsion. While it is sometimes beneficial to inject a preflush solution in order to assure that the emulsion does not contact water in the formation which may be deleterious to the emulsion system, it should be emphasized that the present invention does not depend on the use of such a preflush. Nevertheless, a preslug of an appropriately formualted brine tends to inhibit degradation of the emulsion by divalent cations in the formation by displacing and exchanging the divalent cations ahead of the emulsion. See, for example, U.S. Pat. No. 4,074,755 (Hill, et al) which issued on Feb. 21, 1978. Both preflush salinity (if preflush is used) and polymer drive water salinity may be different from resident brine salinity, but the final reservoir salinity will generally govern the salinity of the translucent emulsion which is injected. A detailed discussion of the selection of appropriate salinity values is unnecessary and beyond the scope of the present disclosure. However, one such discussion may be found in S. P. Gupta and S. P. Trushenski, "Micellar Flooding-Compositional Effects on Oil Displacement," SPE 7063, presented at the 5th Symposium on Improved Methods for Oil Recovery, SPE of AIME, Tulsa, Oklahoma, Apr. 16-19, 1978.

EXAMPLE I

Experiments were conducted to demonstrate the emulsion characteristics of a liquid composition made according to the present invention. An emulsion system was prepared from an initial microemulsion having the following composition (percent by weight, unless otherwise noted):

| Surfactant | 4% | (monoethanolamine salt of C$_{12}$-orthoxylene sulfonate) |
|---|---|---|
| Cosolvent | 0.7% | (sec-butyl alcohol) |
| Oil | 4% | (91% Isopar M, an aliphatic oil; and 9% A150, an aromatic white oil) |
| Brine | Balance | (1.94% NaCl) | and a polymer-brine phase of the following composition:

| Polymer | 200 ppm | (Pfizer 1035, a heteropolysaccharide) |
|---|---|---|
| Brine | Balance | (1.94% NaCl) |

The selected microemulsion and polymer-brine phases were thoroughly mixed in a volume ratio 40:60, and allowed to separate. Mixing under controlled shear conditions was accomplished by rotating the two phases in a test tube about its transverse axis at a constant 12 rpm. The final phase volume ratio following equilibration was 82:18, microemulsion:polymerbrine (referred to hereinafter as the "82/18 system"). It may be noted that the resulting equilibrated microemulsion phase is an "oil-deficient" middle-phase microemulsion. In other words it is a composition like SSE-3 which lies in the left "envelope" of the ternary diagram of FIG. 2. Such a microemulsion is particularly preferred as the external phase due to its ability to solubilize and displace oil without forming phases tending to plug a formation.

The chemical compositions of the two phases of the final equilibrated 82/18 system were determined and used to prepare additional quantities of the translucent emulsion. The interfacial tension between the external microemulsion phase and internal polymer-brine phase was measured to be about $4 \times 10^{-5}$ dynes per centimeter.

The value of $\mu_{min}$ was determined according to the described procedure to be 6 cp at 11 sec$^{-1}$ for a particular Berea sandstone core, while the viscosity of the 82/18 system was about 10 cp at 11 sec$^{-1}$. Thus, good mobility control would be expected upon flooding with the 82/18 system.

Figure 3:
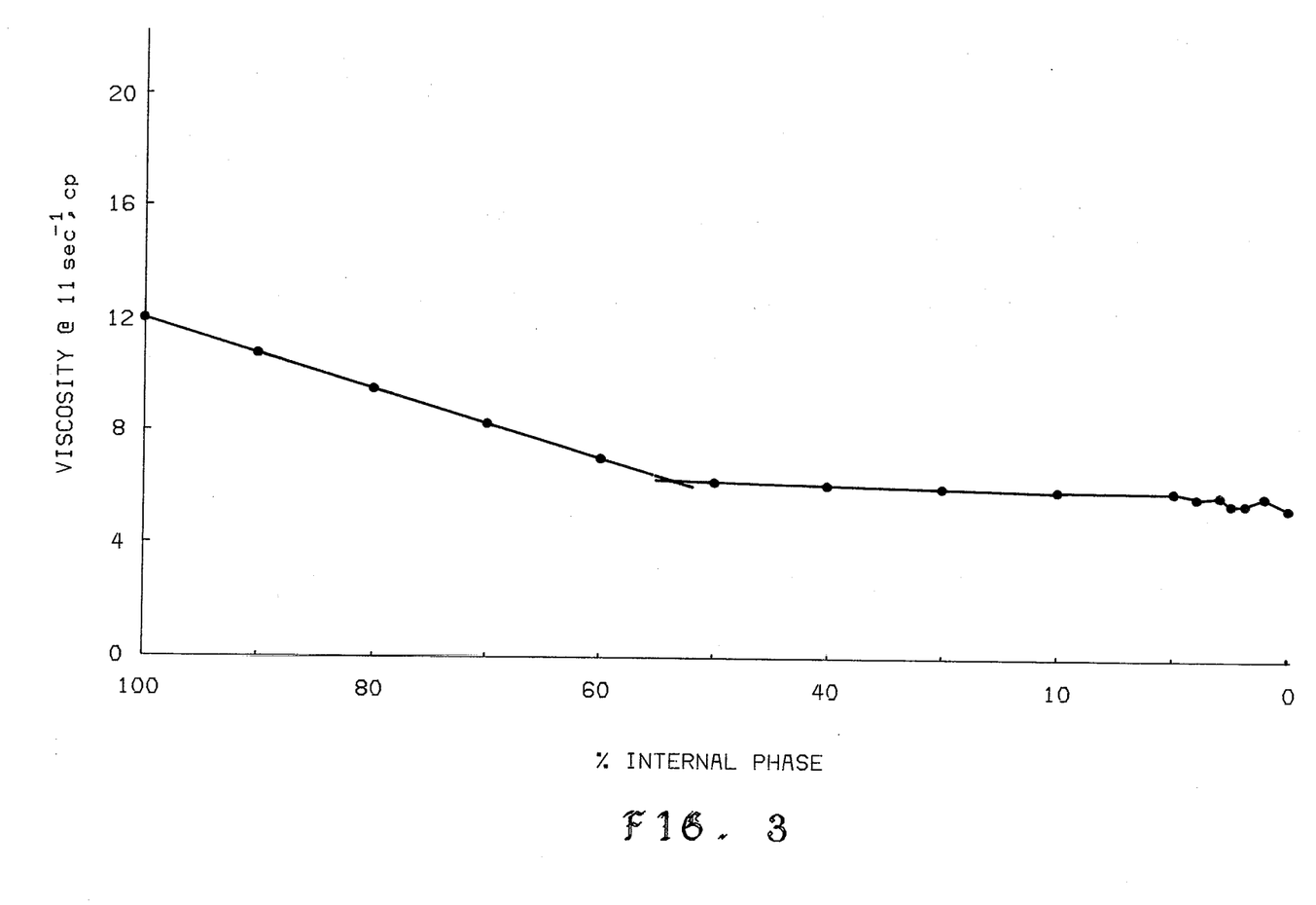
FIG. 3 is a plot of emulsion viscosity versus the percent of internal phase.

A series of emulsion samples was then prepared which varied the relative amount of microemulsion and polymer-brine phase at constant chemical concentration in each phase. The viscosity of each sample was measured and plotted as a function of relative internal (polymer-brine) phase volume. The results are shown in FIG. 3, and clearly demonstrate the existence of an emulsion having an internal polymer-brine phase and an external microemulsion phase. From 0-5% polymer-brine, there are so few droplets of internal phase the system is barely reproducible in rheology. From 10-50% polymer-brine, the viscosity of the emulsion is practically independent of the polymer-brine droplet concentration—i.e., it is acting like a dilute dispersion and the polymer droplets are behaving independently of one another. Finally, from 60-100% polymer, there is strong sphere-sphere interaction, and viscosity depends linearly on polymer droplet concentration. The viscosity behavior is what might be expected of an emulsified mixture of two immiscible liquids.

EXAMPLE II

To further characterize the nature of the 82/18 system of Example I, the droplet size of the internal polymer-brine phase was determined by filteration experiments conducted with Nucleopore (TM) filters. Nucleopore (TM) filters have precisely defined cylindrical pores of known diameter. Filtration was attempted for 0.4, 0.2, 0.1 and 0.05 micron filters. The 82/18 system emulsion passed through 0.4 and 0.2 micron filters with virtually no resistance to flow. Using a pressure of 30 psi, the filtration rate through the 0.1 micron filter reduced to near zero in one hour, indicating great resistance to flow and probably deforming the internal phase. No emulsion could be forced through the 0.05 micron filter. It was therefore concluded that the size of the internal polymer-brine phase droplets is between 0.1 and 0.2 microns and probably nearer to 0.1 microns for the 82/18 system. The droplet size of the shear-stabilized emulsion is significantly smaller than the droplet size of ordinary emulsions and accounts, in part, for the superior core flooding results presented below.

EXAMPLE III

Figure 4:
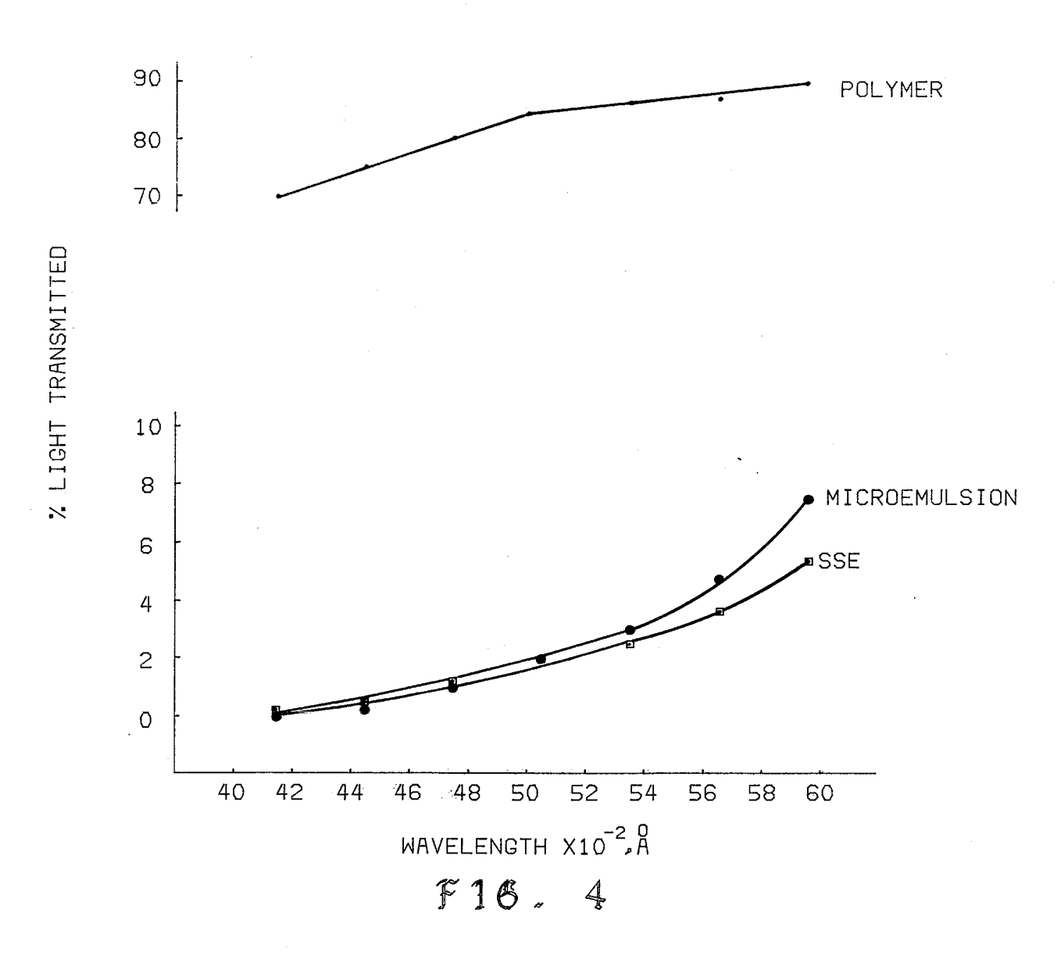
FIG. 4 is a plot of percent of light transmitted versus wavelength of the light for a particular emulsion.

The translucent character of the 82/18 system was investigated by passing light of varying wavelengths through a sample. The results are depicted in FIG. 4. In general, although slightly less light is transmitted compared to the external microemulsion phase alone, it can be seen that the emulsion is quite translucent. In fact, between 4200Å and 5000Å, the percent of light transmitted by the emulsion is essentially equivalent to that transmitted by the external microemulsion phase alone. In contrast, an ordinary emulsion would transmit close to 0% of the light at any wavelength of FIG. 4.

It should also be noted that if the emulsions are prepared using crude oils ("dirty" oils), the emulsions might not appear to be translucent in the ordinary sense, although they would still appear almost as translucent as the microemulsion external phase. This is often simply due to the presence of color bodies in the crude oil which can interfere with light transmission, regardless of the true physical nature of the liquid being examined (e.g., even a microemulsion may not appear "translucent"). However, if a synthetic white oil of the same equivalent alkane carbon number as the crude oil were substituted, the emulsions would appear translucent. Thus, the expression "translucent emulsion" should be understood to include emulsions which use such dirty oils and do not transmit light due to the presence of color bodies in such oils, but which would transmit light if an equivalent oil component were used which does not contain color bodies tending to prevent light transmission.

EXAMPLE IV

Core flooding experiments were conducted using the 82/18 system in order to demonstrate the effectiveness of shear-stabilized translucent emulsions in displacing oil at low surfactant concentrations. In correlating the data, it is useful to define a "use-factor" which indicates the amount of surfactant used with respect to the injected emulsion bank size. The use-factor is defined as the overall surfactant concentration, $C_s$ (volume % of the emulsion bank) times the bank size (% pore volume of the core, %PV).

In each flood, varying bank sizes were injected into a 4 foot long Berea core at a constant use-factor of 25. Thus, for an 82/18 system emulsion containing relative amounts of microemulsion external phase to polymer-brine internal phase in the ratio 50:50, a bank size of 25.8% was injected to give a $C_s \times B$ of 25; for a 30:70 ratio, a bank size of 42.9% was injected for the same $C_s \times B$ of 25. The overall concentration of surfactant is reduced, although surfactant concentration of the microemulsion phase alone is invariant. As noted previously, the relative volumes of external phase and internal phase may be varied so long as the proper equilibrated chemical proportions are used in the internal and external phases as established previously to give the translucent macroemulsion; in this instance the 82/18 system composition was utilized.

The Berea core for each flood contained, as the residual oil and the resident brine, the same oil and brine used to prepare the emulsion. Each emulsion bank was injected at a one foot per day frontal velocity and after injection of an amount giving $C_s \times B$ of 25, the final oil saturation of the core was determined for each flood. The results are plotted in FIG. 5. It may be seen that for the 82/18 system, final oil saturations varied from 5.2% PV for a 30:70 ratio (external phase volume to internal phase volume) to 12.7% PV for a 4:96 ratio.

Figure 5:
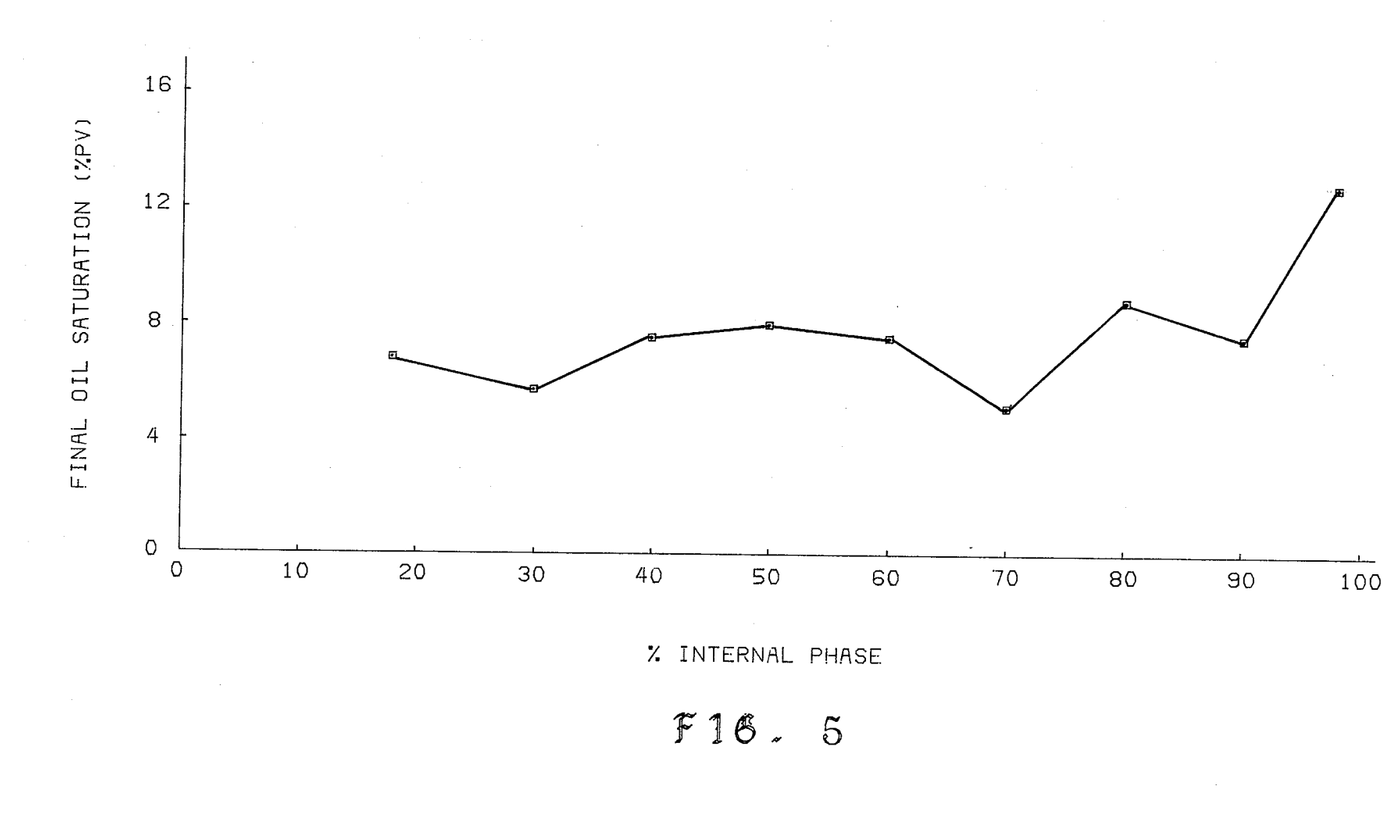
FIG. 5 is a plot of final oil saturation versus the percent of internal phase for various core floods.

These results demonstrate that excellent oil recoveries may be obtained at low surfactant concentrations. In addition, the data of FIG. 5 show that large bank sizes containing larger volumes of polymer-brine phase may be employed without a significant increase in final oil saturations, at least until very large amounts of polymer-brine are used (as with 4:96 ratio). Even then, oil recovery is acceptable. The ability to employ large bank sizes is important since this delays bank deterioration in consequence of dilution at the front and rear of the emulsion bank. More important, a large bank size is able to more effectively sweep a large, heterogenous reservoir volume simply because of increased throughput of fluids.

By comparison, conventional microemulsion flood employ use-factors on the order of 50-200, and final oil saturations are usually higher even though larger amounts of surfactant are used. The present invention in effect permits the quantity of surfactant used to be significantly reduced as compared to conventional microemulsion flooding, while achieving equivalent or better oil recoveries. Often only one-half or less of the surfactant conventionally required may be used.

The principles of the invention and its best mode have been described. It is to be understood that the foregoing is illustrative only and that other means and techniques can be employed without departing from the true scope of the invention defined by the following claims:

What we claim is:

1. A process for recovering crude oil from a subterranean reservoir penetrated by an injection well and a production well which comprises injecting into said reservoir through said injection well a translucent emulsion having an external microemulsion phase and an internal brine phase containing a water soluble, polymeric viscosifier, said emulsion tending to be stabilized by any shearing force imposed thereon during flow through said reservoir, said external microemulsion phase comprised of water, oil and a surfactant, and being in chemical equilibrium with said internal brine phase with an interfacial tension therebetween of less than $10^{-3}$ dynes/cm; driving said emulsion and said crude oil through said reservoir towards said production well; and recovering said crude oil through said production well.

2. A method of recovering oil from a subterranean formation which is penetrated by at least one production well and one injection well, the method which comprises:
  (a) preparing a middle- or upper-phase microemulsion comprised of water, oil and a surfactant;
  (b) preparing an aqueous solution containing a water soluble polymeric viscosifying agent, said aqueous solution and said microemulsion being immiscible but capable of forming a translucent microemulsion-external emulsion under a relatively low shear such as that imposed on a fluid moving through said formation, said microemulsion and said aqueous phase being in chemical equilibrium with each other and having an interfacial tension therebetween of less than $10^{-3}$ dynes/cm;

(c) injecting into said injection well said microemulsion and said aqueous solution so that they enter said formation in the form of said translucent emulsion;

(d) driving said emulsion and said oil through said formation towards said production well at a rate calculated to impose at least said relatively low shear on said emulsion; and 3. The method of claim 3 wherein the amount of said viscosifying agent is sufficient to make the viscosity of said emulsion greater than the viscosity of said oil.

4. The method of claim 2 wherein said microemulsion and said aqueous solution are pre-mixed to form said emulsion for injection into said injection well.

5. The method of claim 2 wherein said emulsion contains a cosolvent.

6. A method of recovering crude oil from a subterranean formation penetrated by at least one production well and one injection well comprising:

(a) injecting into said injection well a translucent emulsion having an external phase and an internal phase in chemical equilibrium, said external phase being an upper- or middlephase microemulsion comprised of water, oil and a surfactant, and said internal phase being an aqueous phase containing a water soluble, polymeric viscosifier, the interfacial tension between said internal and external phases being less than $10^{-3}$ dynes per centimeter;

(b) driving said translucent emulsion and said crude oil through said formation towards said production well, said emulsion being stabilized by the shear imposed thereon while flowing through said formation; and, (c) recovering said crude oil through said production well.

7. The method of claim 6 wherein the internal phase volume is greater than the external phase volume.

8. The method of claim 6 wherein said formation contains a brine having a characteristic salinity, and said internal phase has a salinity which approximates said characteristic salinity.

9. The method of claim 6 wherein said microemulsion is designed so as to be at optimal salinity for phase behavior.

10. An emulsion having an internal phase dispersed as droplets in an external phase, wherein said external phase comprises a middle- or upper-phase microemulsion comprised of water, oil and a surfactant and said internal phase comprises an aqueous solution of inorganic salts and a water soluble, polymeric viscosifier, said internal phase and said external phase being in chemical equilibrium with each other and having an interfacial tension therebetween of less than $10^{-3}$ dynes per centimeter, said emulsion being translucent and being stabilized by a relatively low rate of shear but tending to coalesce under no shear.

11. The emulsion of claim 10 wherein said droplets are about 1.0 micron or less in diameter.

12. The emulsion of claim 10 wherein said viscosifier is a heteropolysaccharide or a polyacrylamide.

* * * * *

UNITED STATES PATENT AND TRADEMARK OFFICE
CERTIFICATE OF CORRECTION

PATENT NO. : 4,337,159

DATED : June 29, 1982

INVENTOR(S) : Ronald L. Reed and Clarence W. Carpenter

It is certified that error appears in the above-identified patent and that said Letters Patent are hereby corrected as shown below:

Column 16, line 25, delete "flood" and insert therefor --floods.--

In claim 2, column 17, between lines 11 and 12, insert --(e) recovering said oil through said production well.--

In claim 3, column 17, line 12, delete "claim 3" and insert therefor --claim 2.--

Signed and Sealed this

Nineteenth Day of October 1982

[SEAL]

Attest:

Attesting Officer

GERALD J. MOSSINGHOFF

Commissioner of Patents and Trademarks